United States Patent [19]

Drinkard, Jr. et al.

[11] Patent Number: 5,980,842
[45] Date of Patent: Nov. 9, 1999

[54] SEPARATION OF CALCIUM FROM METAL COMPOUNDS

[75] Inventors: William F. Drinkard, Jr., Charlotte; Hans J. Woerner, Mt. Pleasant, both of N.C.

[73] Assignee: Drinkard Metalox, Inc., Charlotte, N.C.

[21] Appl. No.: 09/117,571

[22] PCT Filed: Feb. 28, 1997

[86] PCT No.: PCT/US97/03221

§ 371 Date: Jul. 29, 1998

§ 102(e) Date: Jul. 29, 1998

[87] PCT Pub. No.: WO97/31860

PCT Pub. Date: Sep. 4, 1997

Related U.S. Application Data

[60] Provisional application No. 60/012,532, Feb. 29, 1996.

[51] Int. Cl.[6] ............................. C22B 26/00; C01F 11/36
[52] U.S. Cl. ........................... 423/155; 423/169; 423/395
[58] Field of Search .......................... 423/1, 658.5, 155, 423/169, 157.3, 395

[56] References Cited

U.S. PATENT DOCUMENTS

| | | | |
|---|---|---|---|
| 2,912,306 | 11/1959 | Kippe et al. | 23/201 |
| 2,985,527 | 5/1961 | Nossen | 71/39 |
| 3,836,627 | 9/1974 | Wiensz et al. | 423/169 |
| 3,919,395 | 11/1975 | Hauge | 423/309 |
| 4,871,519 | 10/1989 | Zikmund et al. | 423/169 |

*Primary Examiner*—Steven Bos
*Attorney, Agent, or Firm*—Dougherty & Associates

[57] ABSTRACT

A method of separating calcium from mixtures of metal oxides, sulfides, nitrates and carbonates. Particulate calcium containing mixtures are leached with nitric acid to form calcium nitrate and metal nitrates, which are heated to dryness and to form metal oxides, while not affecting the calcium nitrate. The resulting mixture is then leached with water to obtain a calcium nitrate containing leachate and a residue of low solubility metal oxides and insoluble metal oxides. If desired, the calcium nitrate can be decomposed to form a lime product.

19 Claims, No Drawings

SEPARATION OF CALCIUM FROM METAL COMPOUNDS

This application claims benefit of provisional application 60/012,532 filed Feb. 29, 1996.

FIELD OF THE INVENTION

The present invention relates to a method for separating calcium from mixtures of metal compounds such as ores, concentrates waste products, by products and the like, and recovering the separated calcium in a useful and profitable form.

BACKGROUND OF THE INVENTION

Calcium is one of the more common elements found in both nature and many manufactured, by-product and waste substances. Its removal or recovery from such substances is often a key process step or requirement in upgrading, recovering or recycling the mixture or compound containing the calcium, or a key step in recovering the calcium in a form such as lime (CaO), which is the main calcium product of commerce.

Present methods of calcium separation from other substances are mainly based on the relative insolubility of calcium sulfate. The recovery and separation of calcium as calcium sulfate has high costs and several limitations. Not only must a source of sulfate, such as sulfuric acid, be acquired, and utilized, but the ultimate product, calcium sulfate, represents a much lesser value when compared to calcium in the form of lime, as calcium sulfate has only very limited markets.

SUMMARY OF THE INVENTION

Ores or metallurgical dusts, preferably in friable, granular or finely divided condition, are leached with nitric acid to form a mixture of calcium nitrate, other metal nitrates and some gangue materials. The nitrates, which are in solution, are removed from the leaching process, and dried at a temperature of from ambient to about 200° C. to drive off the water and create a residue of solids. The solids are then heated to a temperature of from 200 to 500° C. to decompose the metal nitrates to solid metal oxides, nitric oxides and oxygen in gaseous form. The gases are removed. Also left behind is calcium nitrate in solid form. The metal oxides have only low solubility or are insoluble. The solids are then leached with water, the calcium nitrate going into solution once more while the metal oxides remain as solids and are thus separated from the calcium nitrate.

If desired, the calcium nitrate can be used as a product in its then current form, or it can be heated to a temperature in excess of 550° C. to decompose it by driving off the nitrogen as $NO_x$ and some of the oxygen, leaving a residue of lime (CaO).

DETAILED DESCRIPTION

The present invention not only separates the calcium from other elements with which it is commonly associated in nature and in industrial by-products, but also recovers it in a form from which it is easily recovered as the main calcium material of commerce, lime. Where desired, the calcium product that has been separated also has a substantial market.

Mixtures or compounds containing calcium and other elements are reacted with nitric acid. Nitric acid readily reacts with metals, oxides, carbonates, ferrites and other forms of natural and manmade mixtures containing calcium to form a mixture of soluble nitrates.

The metals commonly associated with calcium are magnesium, copper, iron, manganese and zinc. In many cases, all of these materials are not present simultaneously. Other metals from which calcium may be separated by the instant process are cadmium, aluminum, nickel, chromium, cobalt, silver, rare earth metals and the nuclear metals, such as uranium. Other metals whose nitrates decompose at temperatures less than 500° C. can also be separated from calcium by this process.

In the practice of the present invention, these mixed nitrate solutions are concentrated and evaporated to dryness. The temperature of the dry solids is raised to between 200 and 500° C. The preferred temperature for this step is about 450° C. At these higher temperatures, all of the nitrates, except calcium nitrate, are decomposed to their oxides, resulting in an admixture of the respective metal oxides, along with anhydrous calcium nitrate.

The resulting admixture is leached with water to dissolve and remove the calcium nitrate, leaving the other metal oxides separated from the calcium. The resulting calcium nitrate can be sold as such for many applications, or evaporated and crystallized to make a solid calcium nitrate product. Alternatively the calcium nitrate may be heated to a temperature above about 550° C., preferably to about 600° C., at which temperatures it will decompose to yield lime (CaO).

In all of these decomposition reactions, the nitrate values are emitted as a mixture of nitric oxides such as $NO+NO_2$ and $O_2$. The nitric oxides and oxygen mixture is recombined, with water to make nitric acid, which is recycled and reused in the process.

As an example, one of the major potential sources of magnesium is dolomitic limestone. This is a naturally occurring limestone which approaches equimolar magnesium and calcium carbonates. It is found in large quantities in many countries throughout the world. Because of the difficulty in separating the calcium and magnesium values economically, it generally finds application only where both values can be utilized, such as the precipitation of magnesium values from sea water and agricultural applications where there is a magnesium requirement as well as a calcium requirement.

This invention allows for an economical and thorough separation of both the magnesium and the calcium values, with both being recovered in their most valuable commercial form as oxides. This is illustrated by the following equations:

$$MgCO_3\ CaCO_3 + 4HNO_3 = Mg(NO_3)_2 + Ca(NO_3)_2 \quad (1)$$

$$Mg(NO_3)_2 + Heat\ (400°\ C.) = MgO + NO + NO_2 + O_2 \quad (2)$$

$$Ca(NO_3)_2 + Heat\ (400°\ C.) = Ca(NO_3)_2 \quad (3)$$

As shown above, the dolomitic limestone is leached with nitric acid to form soluble magnesium nitrate and calcium nitrate. The leachate is heated to evaporate the water a temperature of from ambient to about 200° C. to obtain a solid residue. The solid residue is then heated to a range of about 330° to about 500° C., preferably to about 430° C., which converts the magnesium nitrate to magnesium oxide, nitric oxides and oxygen, but has no effect on the calcium nitrate. The dried solids are then washed with water to obtain a calcium containing leachate product and an insoluble magnesium oxide residue. By separating the liquid from the solid the magnesium values are effectively separated from the calcium values.

The calcium nitrate may be the final product or, it may be heated to a temperature of at least about 550° C. to convert it to calcium oxide, NO, NO2 and oxygen. The gases which evolve from the heating steps, nitric oxides and $O_2$, are preferably recombined with water to form nitric acid for reuse in the invented process or elsewhere.

As a test, a mixture of calcium, magnesium, manganese and zinc oxides with trace amounts of aluminum, cadmium, chromium, copper, iron, and lead oxides was processed in accordance with this invention. Processing this material with a nitric acid leachant, resulted in a mixture of calcium, magnesium, manganese and zinc nitrates. To separate the calcium from the other elemental values, the temperature of the mixture was raised to the range of 200 to 450° C. The procedure followed was:

EVAPORATION AND DECOMPOSITION

A quantity of 950 ml of iron free and heavy metal free leachate was placed in a one liter beaker and evaporated to a concentrated solution on a hot plate. The concentrated solution was transferred into a 2-liter glass reactor with a stirrer and was heated with stirring to evaporate and decompose the solids and cause the vaporization of $NO_x$. The temperature was raised to 430° C. After 235 minutes $NO_x$ ceased evolving from the reaction. The solids were allowed to cool. This produced the following results:

| Al | Ca | Cd | Cr | Cu |
|---|---|---|---|---|
| .140 | 5.868 | .017 | .008 | .057 |

| Fe | Mg | Mn | Pb | Zn |
|---|---|---|---|---|
| .034 | 2.323 | 1.600 | .369 | 60.085 |

WATER EXTRACTION OF DECOMPOSED RESIDUE

A quantity of 360 g of distilled water was charged into a 600 ml beaker. The water was agitated and 180 g of decomposition residue was added. After 60 minutes of extracting, the solution was filtered. This produced the following results:

PERCENTAGE EXTRACTED FROM DECOMPOSITION RESIDUE

| Al | Ca | Cd | Cr | Cu | Fe | Mg | Mn | Pb | Zn |
|---|---|---|---|---|---|---|---|---|---|
| 23.1 | 90.5 | 3.5 | | | 2.4 | 0.1 | 0.0 | | 0.0 |

The percentages are for the extraction of the materials present in the decomposition residue. They do not relate to the magnitude of these materials in the residue, only to the percent removed.

SUMMARY OF THE ACHIEVEMENT OF THE OBJECTS OF THE INVENTION

From the foregoing, it is readily apparent that we have invented an improved method for treatment of calcium containing metal compounds and recovery of marketable calcium products which is more economical than heretofore has been possible. This process provides a method for separation of magnesium, copper, iron, manganese, and zinc, among others. Yet, this process can be operated at individual by products or waste generating locations, eliminating the need for transportation of wastes. This process, which can be installed contiguous with metallurgical waste generation, reduces the cost of waste storage existing and future environmental liability. Valuable calcium compounds are separated from ores, wastes, or metallurgical by-products using this process.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A method of separating calcium from other elements in a mixture of calcium-containing metal oxides, nitrates, sulfides, and carbonates, comprising:
    leaching the mixture with nitric acid to form a calcium-containing metal nitrate mixture;
    raising the temperature of the calcium containing metal nitrate mixture to a temperature sufficient to decompose all contained nitrates except calcium nitrate; and
    leaching the calcium containing metal nitrate mixture with water to obtain a calcium containing leachate and a residue of low solubility oxides and insoluble oxides.

2. A method according to claim 1 wherein the calcium containing metal nitrate mixture is heated to a temperature in the range of about 200° C. to about 500° C.

3. A method according to claim 2 wherein the calcium containing metal nitrate mixture is heated to a temperature in the range of about 200° C. to about 450° C.

4. A method according to claim 1 wherein the non-calcium metals in the metal nitrate mixture are selected from the group consisting of magnesium, copper, iron, manganese, cadmium, aluminum, zinc, nickel, cobalt, uranium, and rare earth metals.

5. A method according to claim 1 further comprising the steps of: evaporating the calcium-containing leachate to obtain solid calcium nitrate; and subsequently heating the solid calcium nitrate to at least about 550° C. to obtain calcium oxide.

6. A method according to claim 1 wherein nitric oxides and $O_2$ are emitted during the heating of the calcium-containing metal nitrate mixture, and are thereafter recombined with water to form nitric acid.

7. A method according to claim 5 wherein nitric oxides and $O_2$ are emitted during the step of heating of the calcium nitrate and are thereafter recombined with water to form nitric acid.

8. A method according to claim 1 wherein said mixture of calcium-containing metal oxides, nitrates, and carbonates are in particulate form.

9. A method of treating dolomitic limestone to separate calcium from magnesium, comprising:
    leaching the limestone with nitric acid to form a leachate containing water and a solid residue;
    separating and evaporating water from the leachate at a temperature from ambient to about 200° C. to obtain a separated solid;
    heating the separated solid to a temperature of about 330° to about 430° C. to convert the magnesium to MgO; and washing the heated solid with water to obtain a calcium containing leachate product and insoluble MgO residue.

10. A method according to claim 9 further comprising evaporating the calcium-containing leachate product to obtain solid calcium nitrate; and then heating the solid calcium nitrate to at least about 550° C. to obtain calcium oxide.

11. A method according to claim 9 wherein nitric oxides and $O_2$ are emitted during heating and evaporation of the leachate mixture, and are thereafter recombined to form nitric acid.

12. A method according to claim 10 wherein nitric oxides and $O_2$ are emitted during the heating of the calcium nitrate, and are thereafter recombined with water to form nitric acid.

13. A method of separating calcium from other elements in a mixture of calcium-containing metal nitrates, comprising:

heating the calcium-containing mixture to a temperature of from about 200° C. to about 500° C.; and leaching the calcium-containing mixture with water to obtain a calcium-containing leachate and a residue of low solubility oxides and insoluble oxides.

14. A method according to claim 13 wherein the temperature of the calcium containing mixture is raised to about 200° C. to about 450° C.

15. A method according to claim 13 wherein the non-calcium metals in the metal nitrate mixture are selected from the group consisting of magnesium, copper, iron, manganese, cadmium, aluminum, zinc, nickel, cobalt, chromium, silver, uranium, and rare earth metals.

16. A method according to claim 13 further comprising the step of: evaporating the calcium containing leachate to obtain solid calcium nitrate; and subsequently heating the solid calcium nitrate to at least about 550° C. to obtain calcium oxide.

17. A method according to claim 13 wherein nitric oxides and $O_2$ are emitted during the heating of the calcium containing mixture of metal nitrates, and are thereafter recombined with water to form nitric acid.

18. A method according to claim 16 wherein nitric oxides and $O_2$ are emitted during the step of heating the calcium nitrate, and are thereafter recombined with water to form nitric acid.

19. A method according to claim 13 wherein the non-calcium metals in the metal nitrate mixture are selected from the group consisting of metals whose nitrates decompose at temperatures less than about 500° C.

* * * * *